J. D. Willoughby's
Improvement in Scales
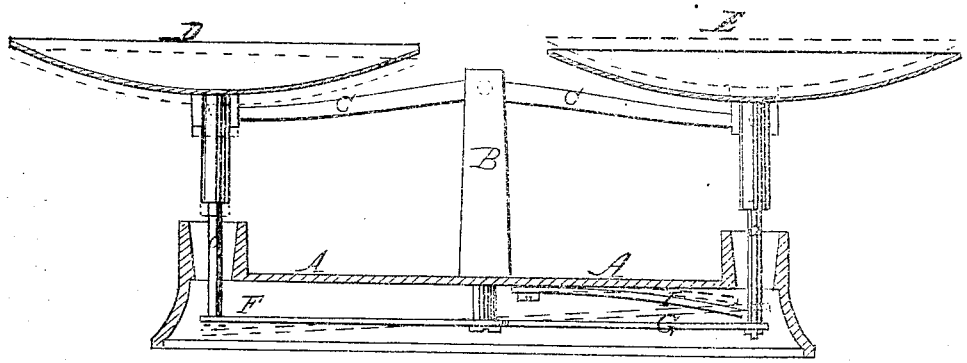
No. 73273
PATENTED
JAN 14 1868
Witnesses
A. A. Yeatman
S. N. Marr
Inventor
James D. Willoughby
per
Alexander Mason
Atty

United States Patent Office.

J. D. WILLOUGHBY, OF SHIPPENSBURG, PENNSYLVANIA.

Letters Patent No. 73,273, dated January 14, 1868; antedated December 28, 1867.

---

IMPROVEMENT IN WEIGHING-SCALES.

---

The Schedule referred to in these Letters Patent and making part of the same.

---

TO ALL WHOM IT MAY CONCERN:

Be it known that I, J. D. WILLOUGHBY, of Shippensburg, in the county of Cumberland, and in the State of Pennsylvania, have invented certain new and useful Improvements in Scales; and do hereby declare that the following is a full, clear, and exact description thereof, reference being had to the accompanying drawings, and letters of reference marked thereon.

In the annexed drawing, making part of this specification, A A represent the base of the scales; B is the upright bearing; C C the balancing part of scale, with a seat, D and E, on each end—D is to receive the weights, and E is to receive the articles to be weighed. The rods O O from D and E extend downwards through the base, A A. These rods are held in a vertical position by means of bars F and G, which are hinged to them at their lower ends. F and G are fastened loosely in the middle of the base, A A.

It will be seen that thus far the scales are made in the usual form, but in addition to the usual construction, I use the spring I, as seen in the drawing, for the purpose hereinafter specified. The spring I is attached at one end to the back or arched part of the base, A A. The loose end runs longitudinally with the base, and inclines downward and near to the bar G, when the scales are at rest in their horizontal position. If ten pounds are now thrown upon the seat D, that end of the scale will sink as far as it can, and will force the spring I upward, by causing the bar G to press against it. Now, if it requires three ounces of weight to overcome the spring, it is evident that when an article is being weighed the scale will begin to move when the seat F lacks three ounces of having ten pounds on it. This movement is a notice to the person weighing, that he has only three ounces more to put on, which he can do with care to avoid putting too much on. The spring I acts until the beam is nearly horizontal, then ceases to act, and leaves the scale to finish the work as if there had been no spring there.

It is claimed that articles can be weighed more hurriedly on scales as above described, because the person doing the work can throw the articles more hastily into the scales, knowing that he will have notice when he has nearly the weight he desires, and can then put on the remaining required weight with more care. As scales are now made, there is no way of knowing to a certainty how much is on until the scales move by having the full weight on them. The scales I have described, can be made to give notice when three ounces, or any number of ounces, more or less, are yet required to make the full weight.

I do not wish to be confined to any particular form or kind of spring, or any particular mode of attaching or applying the spring, nor to any form of scales or part of the scales to which the spring shall be applied. The object aimed at is to make the scales give notice by moving before the entire weight is on which is desired to be put on to balance the weighted end of the scales. Any spring or weight that will accomplish the object just named can be used as the equivalent of the spring I have shown. A three-ounce weight could be so attached to the scales as to make them move or give notice as the spring I now does. The mode of attaching can be varied, and need not be described, being the equivalent of the spring.

Having thus fully described my invention, what I claim as new, and desire to secure by Letters Patent, is—

The spring I or its equivalent, in combination with the scales, for the purpose set forth.

In testimony that I claim the foregoing, I have hereunto set my hand, this 20th day of June, 1867.

J. D. WILLOUGHBY.

Witnesses:
A. N. MARR,
CORNELIUS COX.